June 30, 1970
J. S. KILGORE
3,517,691
AIRFLOW CONTROL FOR AN AIR-FLUID MIXING PUMP
Filed April 4, 1968
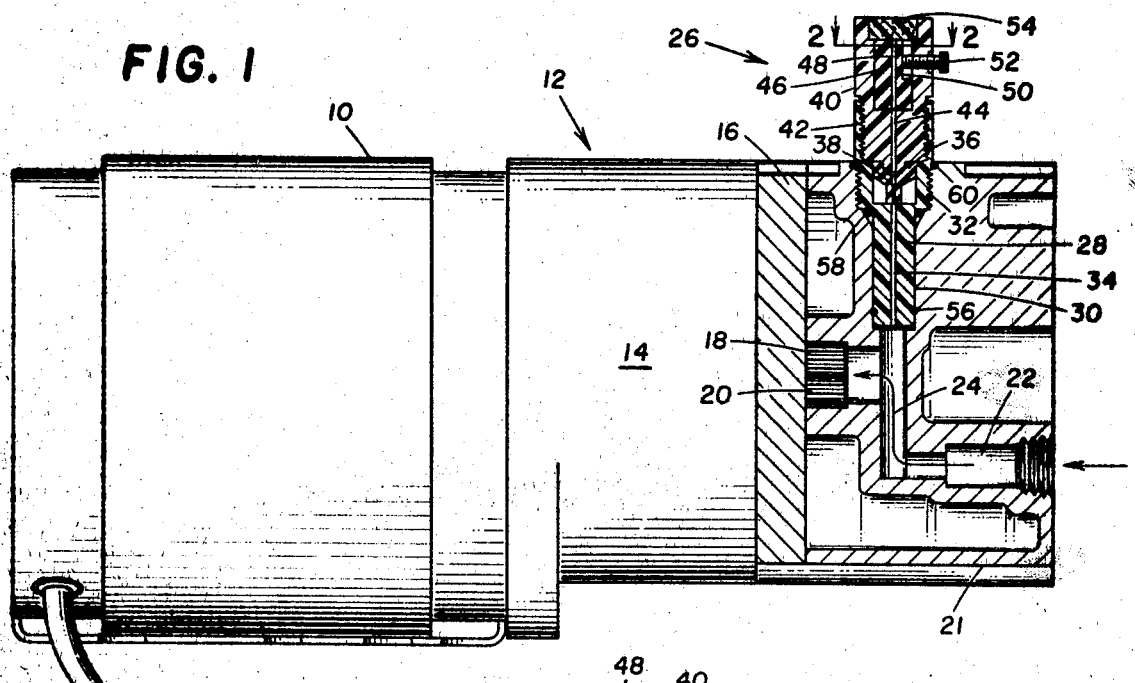
FIG. 1
FIG. 2
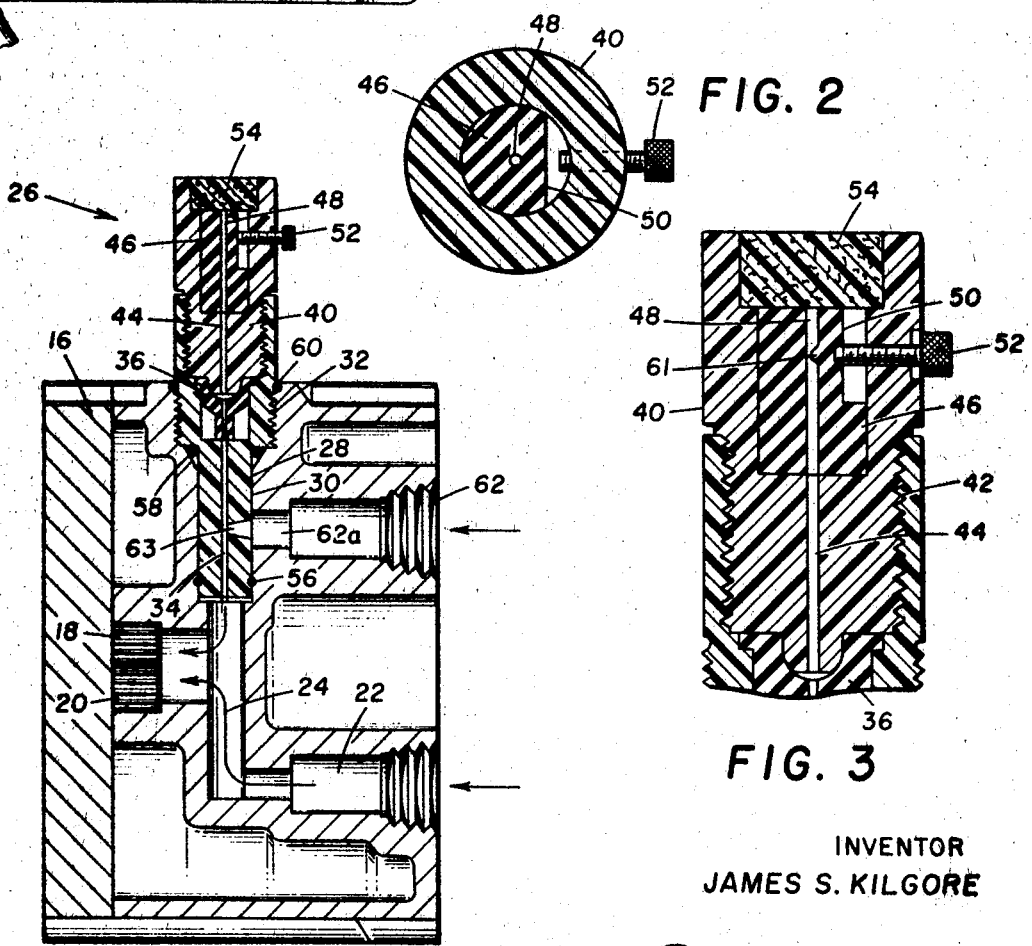
FIG. 3
FIG. 4
INVENTOR
JAMES S. KILGORE
Richards, Harris & Hubbard
ATTORNEY

United States Patent Office 3,517,691
Patented June 30, 1970

3,517,691
AIRFLOW CONTROL FOR AN AIR-FLUID MIXING PUMP
James S. Kilgore, Dallas, Tex., assignor to Polyspede Electronics Corporation, Dallas, Tex., a corporation of Texas
Filed Apr. 4, 1968, Ser. No. 718,878
Int. Cl. F16k 7/06, 19/00
U.S. Cl. 137—550
9 Claims

ABSTRACT OF THE DISCLOSURE

An air valve for a pump which mixes metered amounts of air with fluid includes a valve member with an air opening therethrough fitted within a counterbore in the pump casing. A resilient member is contained within the valve member and has a bore therethrough which communicates with the air opening through the valve member. A screw is threaded through the valve member and abuts against the resilient member. The screw may be adjusted lengthwise to selectively deform the resilient member to constrict the bore and control the amount of air passing through the air opening. A check valve is also contained within the valve member to prevent the passage of fluid through the air opening.

FIELD OF THE INVENTION

This invention relates to air valves, and more particularly to air valves for metering air which is mixed with fluid in a mixing pump.

THE PRIOR ART

It is desirable in many applications to mix metered amounts of air with fluid. For instance, in the production of soft ice cream, it is necessary to accurately adjust the amount of air which is evenly intermixed with the pre-cooled ice cream mixture before freezing thereof, as the percentage of air contained within the ice cream is determinative of the quality of the ice cream product.

Heretofore, needle valves have been used to meter the amount of air which was intermixed with precooled ice cream mix. Such needle valves have comprised a needle member movable along the axis of a narrow chamber in order to vary the effective aperture through the chamber. These needle valves are not only relatively expensive, but it is difficult to maintain the needle members exactly aligned within the center of the narrow chamber. When the needle member is not exactly centered, the needle valve causes surges of air to be introduced into the precooled ice cream mixture rather than a smooth flow of metered air, thereby creating voids in the ice cream and causing an uneven consistency of the ice cream. Additionally, thread valves which utilize a threaded needle to provide a resistance valving effect have been heretofore used to meter air to precooled ice cream mix, but these valves are subject to the same problems as the needle valves and are even more expensive to manufacture.

SUMMARY OF THE INVENTION

In accordance with the present invention, an air valve is provided which includes a valve casing having an air opening therethrough and which is received within a counterbore in a fluid mixing pump. A resilient valving member is disposed within the valve casing and includes a bore therethrough which communicates with the air opening in the valve casing. A screw member is threaded through the valve casing and abuts against the resilient valving member. Upon adjustment of the screw, the resilient valving member may be deformed to selectively constrict the bore to adjust the amount of air which is intermixed within the fluid mixing pump.

Further aspects of the present invention include a check valve disposed within the valve casing to prevent the entry of fluid within the valve. An air filter is also provided within the valve casing to filter the air passing therethrough. Seals about the valve casing prevent unmetered air from leaking past the valve into the mixing pump.

BRIEF DESCRIPTION OF THE DRAWINGS

For a more complete understanding of the invention, and for further objects and advantages thereof, reference is now made to the following description taken in conjunction with the accompanying drawings, in which:

FIG. 1 is a side view, partially sectioned, of a metering pump utilizing the present valve;

FIG. 2 is a sectional view taken along section lines 2—2 of FIG. 1;

FIG. 3 is a sectional view of a portion of the present valve; and

FIG. 4 is a cross-sectional view of a portion of a metering pump utilizing another embodiment of the present valve.

Referring to the figures, wherein like numbers refer to like and corresponding parts, FIG. 1 shows a pump motor 10 for driving a mixing pump designated generally by numeral 12. Pump 12 includes a pump-mounting unit 14 secured between the motor 10 and a pump seal plate 16. Motor 10 rotates a shaft (not shown) passing through the pump-mounting unit 14 to rotate meshed gears 18 and 20. Gears 18 and 20 fit within a cavity in a distribution casing 21. Rotation of the gears draws fluid through a fluid inlet 22 along a flow path illustrated by the arrow 24 and then passes the fluid out through an outlet (not shown) in the face of the distributor casing 21. The structure and operation of a similar metering pump is described in Pat. No. 3,390,638, entitled Variable Proportioning Metering Pump, by Hope B. Adams.

The mixing pump shown in FIG. 1 may be advantageously used in the preparation of soft ice cream, with the pre-cooled ice cream mixture being passed in through the inlet 22. As previously discussed, it is desirable to intermix a preselected amount of air with the pre-cooled ice cream mix. Such mixing of air is accomplished with an air valve designated generally by the numeral 26. Valve 26 includes a cylindrical casing member 28 the lower part of which fits within a counterbore 30 through the distributor casing 21. The upper portion of the casing member 28 is threadedly received within a threaded counterbore 32 extending through the distributor casing 21.

An air opening 34 extends along the length of the casing member 28. A check valve 36 is received within a counterbore in the top of the casing member 28. Although check valve 36 may comprise any one of a number of suitable one way valves capable of preventing the entrance of fluid upwardly through the air opening 34, in a preferred embodiment check valve 36 comprises a resilient member having a slotted opening 38 therethrough. Air may pass downwardly through the slotted opening 38, but the flexible bottom portion of the valve 36 tends to seal against upward flow of fluid. Check valve 36 is preferably made from elastomeric material such as a suitable synthetic rubber.

A cylindrical upper valve casing 40 has a bottom portion threadedly received by threads 42 in the casing member 28. Preferably, both casing member 28 and upper valve casing 40 are constructed from a non-corrosive material such as Delrin, or the like. Upper valve casing 40 includes an air opening 44 through the length thereof which communicates with the slotted opening 38 and the air opening 34. A resilient valve member 46 is disposed within a counterbore in the valve casing 40 and includes an air passage 48 through the center thereof.

Resilient valve member 46 comprises a cylindrical body constructed from any suitable resilient material such as rubber or the like. As shown in FIGS. 1 and 2, a portion of the valve member 46 is cut-out to form a shoulder 50. A screw 52 is threadedly received through an opening in the wall of the valve casing 40 and extends to the shoulder 50. An air filter 54 is constructed from suitable fibrous or cellular material and is fitted in the top of the valve casing 40 to filter air passing through the valve. O-rings 56, 58 and 60 prevent the leakage of unmetered air past the valve 26.

In normal operation of valve 26, fluid passes through the inlet 22 and is intermixed with air drawn through the air filter 54 and the air openings 48, 44, 38 and 34. The fluid mixed with air is then passed through the meshed gears 18 and 20 and through an outlet (not shown) for dispensing and use. In order to adjust the amount of air which is drawn through valve 26 for mixing with the fluid passing through the inlet 22, the screw 52 may be selectively adjusted in order to deform the upper portion of the resilient valve member 46 and constrict the air passage 48.

FIG. 3 illustrates an adjusted position of the present apparatus wherein screw 52 bears against the shoulder 50 and constricts the passage 48 at a deformed portion 61. Upon further rotation of the screw 52, the air passage 48 may be completely closed, or accurately adjusted to any one of a number of different opening areas. Once set, the screw 52 remains in position and the valve 26 provides a very smooth flow of air, thus eliminating any surges of air which sometimes occur with the use of needle valves.

The structure shown in FIG. 4 is similar to the pump shown in FIG. 1, with the exception of a second fluid inlet 62 adapted to be connected to a second supply of fluid. A slot 63 is disposed through the wall of the casing member 28 to provide communication between fluid inlet bore 62a and the air opening 34. Rotation of the casing member 28 relative to the distributor casing 21 varies the proportion of the slot 63 which is exposed to the inlet bore 62a, thereby varying the amount of fluid passing through the slot 63 and down the opening 34.

The one-way check valve 36 prevents the flow of fluid upwardly through the valve 26. Calibration marks are provided around the valve 26 about the outside of the distributor casing 21 so that the amount of liquid flow through the slot 63 may be adjusted. The screw 52 may be rotated to adjust the amount of air passing through the air opening 34, and thus the present valve may vary both the amount of fluid and air passed into the pump.

What is claimed is:

1. In a mixing system wherein metered amounts of air are mixed with fluid, the combination comprising:
   casing structure having a fluid inlet therein with a bore in said casing structure communicating with said fluid inlet,
   a valve casing having an air opening therethrough fitted within said bore,
   resilient means disposed within said valve casing and having an airflow path communicating with said air opening in said valve casing,
   means for deforming said resilient means to constrict said airflow path to adjust the amount of air passing through said air opening,
   a second fluid inlet disposed in said casing structure in communication with said bore adjacent said valve casing, and
   said valve casing having an opening in the side thereof communicating with said second fluid inlet and being rotatable to vary the area of said opening exposed to fluid flow.

2. The combination of claim 1 and further comprising check valve means disposed in said valve casing to prevent flow of fluid other than air through said resilient means.

3. The combination of claim 2 wherein said valve casing comprises upper and lower casing portions threadedly connectable to define a cavity therein for reception of said check valve means.

4. The combination of claim 1 wherein said resilient means comprises a cylinder made from elastomeric material and having a central bore therethrough.

5. The combination of claim 1 and further comprising an air filter disposed in said valve casing.

6. The combination of claim 1 wherein said means for deforming comprises a screw threadedly received in a side wall of said valve casing.

7. A fluid valve for use in a mixing system for metering amounts of air for mixture with a fluid comprising:
   a cylindrical first casing member having a bore therethrough and including means for attachment to a casing structure of said mixing system,
   a flexible check valve means disposed in a counterbore portion of said casing member to prevent flow of fluid other than air through said bore,
   a second valve casing member dimensioned to fit within and being connectable with said first casing member and including a bore therethrough,
   an elastomeric member having a central opening therethrough disposed within a centrally located counterbore portion of said second casing member, said central opening communicating with said bores, and
   screw means threadedly received within the wall of said second casing member and rotatable to deform said resilient members to selectively constrict said opening for adjustment of the passage of air therethrough for mixture with the fluid.

8. The fluid valve of claim 7 and further comprising:
   filter means disposed within said second casing member adjacent said elastomeric member for filtering of the air passing through said bore.

9. The fluid valve of claim 7 and further comprising:
   a fluid inlet disposed in the casing structure of said mixing system in communication with an opening in the side of said first casing member,
   said first casing member and said casing structure being relatively rotatable in order to vary the area of said opening exposed to fluid flow from said fluid inlet.

References Cited

UNITED STATES PATENTS

| | | | |
|---|---|---|---|
| 1,838,940 | 12/1931 | Griffiths | 137—604 XR |
| 2,197,995 | 4/1940 | Crowley | 251—7 |
| 2,733,835 | 2/1956 | Alfery et al. | |
| 2,809,663 | 10/1957 | Farwick | 137—604 XR |
| 2,954,028 | 9/1960 | Smith | 251—8 XR |
| 3,049,142 | 8/1962 | Oliver | 251—7 XR |

FOREIGN PATENTS

| | | |
|---|---|---|
| 502,094 | 3/1939 | Great Britain. |

ROBERT G. NILSON, Primary Examiner

U.S. Cl. X.R.

137—565, 606; 251—8